June 15, 1965 J. A. NUCKOLLS 3,189,790
STARTING AND OPERATING CIRCUIT FOR GAS DISCHARGE LAMPS
Filed July 2, 1962
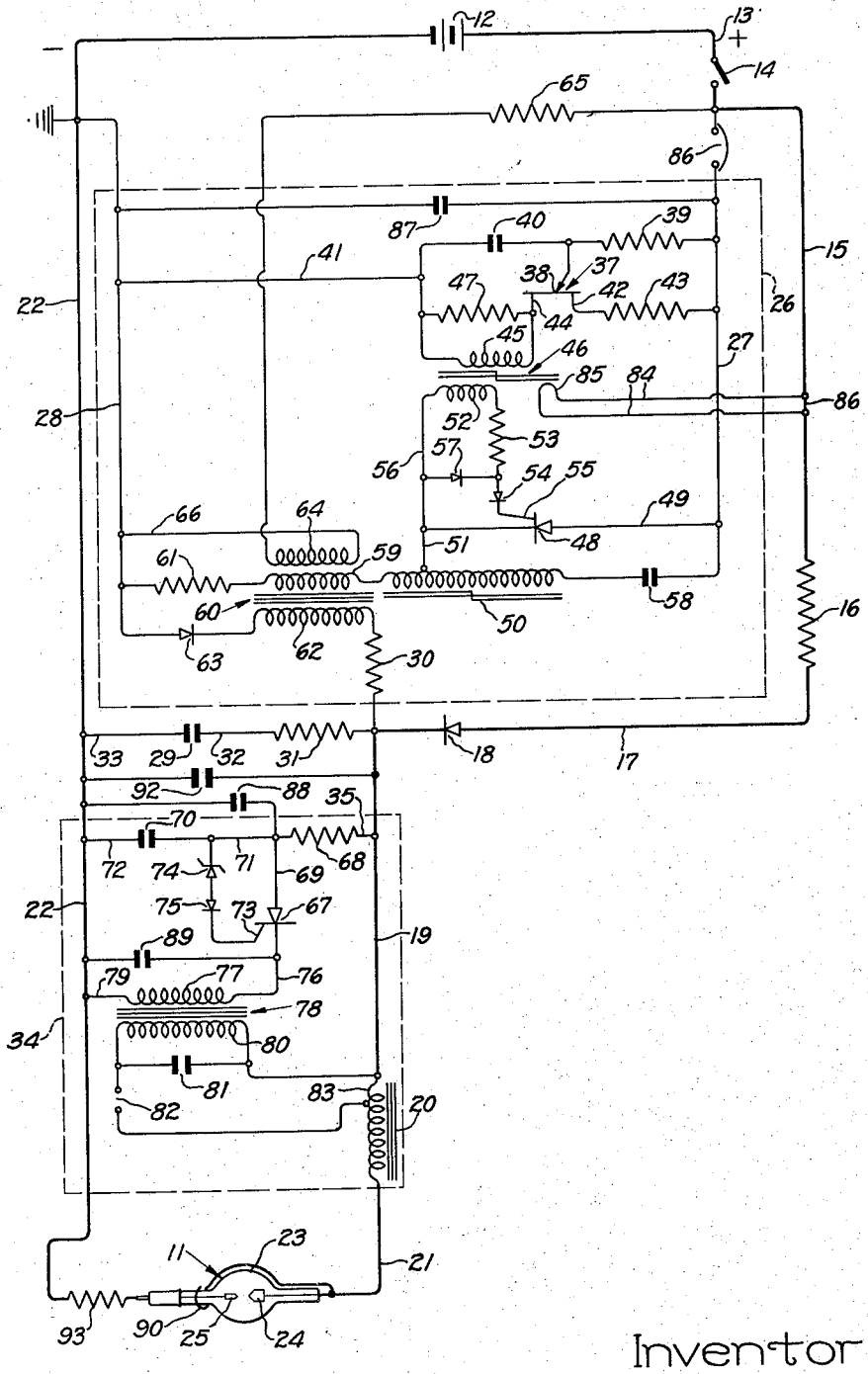
Inventor:
Joe A. Nuckolls
by Henry T. Olsen
His Attorney United States Patent Office 3,189,790
Patented June 15, 1965

3,189,790
STARTING AND OPERATING CIRCUIT FOR GAS DISCHARGE LAMPS
Joe A. Nuckolls, Hendersonville, N.C., assignor to General Electric Company, a corporation of New York
Filed July 2, 1962, Ser. No. 206,613
8 Claims. (Cl. 315—289)

This invention relates to a circuit for starting and operating a high intensity arc discharge lamp and particularly to a circuit operable from a low voltage direct current source.

The high intensity light source utilizes a xenon arc discharge lamp. This lamp is rated to operate at 100 amperes, 20 volts D.C. and thus is well within the range of a battery energy output. The lamp is a two-electrode polarized arc lamp with a thoriated tungsten cathode and a tungsten anode. Initially, a high voltage starting pulse of 30–50 kv. must be applied across the electrodes to ionize the xenon gas and form a conduction path within the lamp. This must be immediately followed by a high current discharge from a source of about 65 volts D.C. minimum to form a hot spot on the cathode for electron emission. Upon emission and starting of the lamp, the power requirements of the arc fall well within the range of a power supply and normal operation follows substantially at 100 amp., 20 volts. An example of a suitable xenon arc discharge lamp is disclosed in U.S. Patent 2,965,790, Ittig et al., issued December 20, 1960.

It is an object of this invention to provide an improved starting and operating circuit for operating a gas filled arc discharge lamp from a low voltage direct current source which includes means for utilizing the direct current source to generate a high voltage pulsating current for starting the lamp and thereafter discontinuing the pulses to provide for operation of the lamp directly from the direct current source at low voltage.

Another object is to provide a starting and operating circuit for the lamp capable of heating the lamp cathode to an emission temperature immediately following application of high voltage pulses to insure lamp conduction from a low voltage direct current source.

A further object of the invention is to provide means in the starting and operating circuit to prevent continued operation of the starting circuit after the lamp is operating directly from the direct current source so that needless component operation is avoided.

Briefly, the improved starting and operating circuit for the xenon arc discharge lamp includes a low voltage direct current source connected electrically in series with a xenon arc discharge lamp and in combination with an inverter rectifier circuit (herein also referred to as a "chopper circuit") for producing a unidirectional pulsating current of a portion of the D.C. supply current to provide a higher pulsating voltage output for charging an energy storage capacitor and initiating operation of a pulse generator circuit. The pulse generator circuit is electrically connected to provide a high voltage pulse to the lamp on the order of 30–50,000 volts so that the gaseous path between the lamp electrodes is ionized to become conductive. The storage capacitor provides a source of electric power sufficient to form an electron emisive hot spot on the lamp cathode. As conduction begins, the capacitor discharges through the lamp providing a flow of electrons between the lamp electrodes reducing the lamp voltage to a point at which the lamp continues to operate directly from the low voltage direct current source. Continued normal operation of the lamp de-energizes the inverter rectifier circuit so that operations of the pulse generator circuit and storage capacitor cease.

Further objects and advantages of the invention will appear from the following specification.

A preferred embodiment of the invention is shown in the drawing.

As shown in the drawing, the operating circuit for discharge lamp 11 includes a low voltage direct current source such as a battery 12, conductor 13, control switch 14, conductor 15, a current limiting impedance 16, conductor 17, high current rectifier 18, conductor 19, autotransformer coil 20, conductor 21, and conductor 22 to ground.

The discharge lamp 11 as shown is a xenon arc discharge lamp comprising an envelope 23 filled with xenon gas and provided with a thoriated tungsten anode 24 and tungsten cathode 25. The lamp operates on approximately 100 amps. at 20 volts D.C.; hence, the source 12 can be a 27.5 volt storage battery as is customarily provided on certain vehicles. However, to ignite the lamp a 30–50,000 volt pulse must be applied across the lamp electrodes to initially ionize the gas.

The starting circuit for the lamp includes a step-up inverter rectifier chopper circuit having a pulsating intermediate voltage output and is shown within the dotted lines 26, as being connected between conductors 15 and 22 by conductors 27 and 28. The output from the inverter rectifier circuit 26 is directed to a secondary circuit including a storage capacitor 29 through resistor 30, resistor 31, conductor 32 and which storage capacitor is connected to ground by conductor 33 so that the capacitor is charged at the intermediate voltage. The starting circuit further includes a pulse generating circuit, shown within the dotted lines 34, which applies a high voltage, short duration pulse to the anode 24 of the lamp 11 through the autotransformer coil 20.

The chopper circuit 26 is provided with a relaxation oscillator circuit which includes a unijunction transistor 37 having its single PN junction, or emitter, 38 connected to conductor 27 through resistor 39, the circuit to ground being completed through capacitor 40, conductor 41 and conductor 28. A first base connection 42 of transistor 37 is connected to conductor 27 through resistor 43. A second base connection 44 is connected to ground through the primary coil 45 of a saturable transformer 46 through conductor 41 and conductor 28. A balancing resistor 47 is provided in shunt relation to the primary coil 45. A silicon controlled rectifier 48 is connected to conductor 27 by conductor 49 and to the primary of a saturable transformer 50 by conductor 51. The secondary coil 52 of saturable transformer 46 is connected in series with a resistor 53 and diode 54 to a control electrode, or gate, 55 of the silicon controlled rectifier 48 and to conductor 51 by conductor 56. To maintain the current unidirectional, diode 57 is connected between conductor 56 and resistor 53.

In operation, the unijunction transistor 37 provides voltage pulses having a high repetition rate set by the time constant of the resistor 39-capacitor 40 circuit into the primary 45 of saturable transformer 46, which pulses are insufficient to saturate the transformer. Thus, by transformer action the silicon controlled rectifier 48 is caused to follow the high repetition rate of the unijunction transistor because of the trigger pulses provided through the secondary 52 of the transformer 46 into the gate 55 of silicon controlled rectifier 48. The high energy, high energy, high frequency pulses are impressed on saturable transformer 50 which places a charge on a commutating condenser 58. The charge on condenser 58 is released as the saturable transformer 50 is driven into saturation and a reverse current at the end of the cycle is applied to the silicon controlled rectifier 48 to cut off operation of control gate 55. The voltage applied through conductor 51 to the effective primary of autotransformer 50 is stepped up by autotransformer action and applied to the primary 59 of step-up transformer 60. The transformer primary 59 is connected to ground through a small resistor 61, which limits the peak current that must be commutated. The stepped-up voltage from secondary 62 is maintained unidirectional by diode 63 and the output of the inverter rectifier circuit 26 is directed to the capacitor storage bank 29 and pulse generator circuit 34, as previously specified above.

Since the transformer 60 is a unidirectional pulse device, there is provided a winding 64 for the transformer 60 which is connected to conductor 15 through resistance 65 and to ground by conductor 66 which serves to reset the transformer 60 between pulses by conducting a current in opposition to the main current direction.

The pulse generating circuit 34 includes a silicon controlled rectifier 67 connected to input conductor 35 through a resistance 68 by conductor 69. An operating capacitor 70 is connected to resistance 68 by a conductor 71 and to ground by conductor 72 to form a charging circuit across the storage capacitor 29. The operating capacitor 70 provides the triggering action for the control gate 73 of silicon controlled rectifier 67 through zener diode 74 and diode 75; the zener diode 74, being a substantially constant voltage device, becomes conductive when the charge on capacitor 70 reaches a predetermined zener voltage level. When said level is reached, the diode 74 becomes conductive, triggering the silicon controlled rectifier 67, which draws energy from the capacitor 70, and discharges a high current pulse through conductor 76, through the primary 77 of a ringing transformer 78, and conductor 79 connecting the coil to ground, the series connection of operating capacitor 70, silicon controlled rectifier 67, and the primary 77 thereby forming a discharge loop.

The secondary 80 of ringing transformer 78 is applied to a pulse transformer circuit including the transformer 20, capacitor 81 and spark gap 82 thereby forming an oscillatory circuit with primary 83 of transformer 20 which induces a damped oscillatory train of high voltage pulses in the pulse transformer circuit. The high voltage pulse from transformer 78 charges the capacitor 81 to the breakdown point of spark gap 82 whereby the high voltage pulse is applied to the effective primary 83 of autotransformer 20, which delivers a higher voltage pulse to the lamp 11 through conductor 21.

As above stated, the inverter rectifier circuit 26 continues to run at a high repetition rate, delivering high voltage pulses until the lamp becomes conductive. When this condition occurs, the lamp draws on the energy in the storage capacitor 29 as a source of intermediate voltage necessary for cathode warm up. The storage capacitor 29 must furnish the intermediate voltage for a time sufficient to allow the voltage drop across the lamp to fall below the value of the source voltage. Then the lamp draws current through the current-limiting impedance 16, and the operation of the step-up inverter rectifier circuit 26 is turned off in the following manner: a wire 84 is provided having a definite resistance and inductance as compared to a resistance 86 of the main lamp current path, as shown. The wire 84 has turns 85 around the core of saturable transformer 46 and connected in parallel to the resistance 86. When a fractional current is drawn through conductor 15, hence, resistance 86, by the lamp 11, the current through turns 85 is sufficient to cause saturation of transformer 46, stopping transformer action. Therefore, the repetition pulses initiated by unijunction transistor 37 are effectively decoupled and the starting means provided ceases operation.

The circuit is provided with certain refinements for building a practical, economical unit. For example, a circuit braker 86 is provided in conductor 27 to prevent damage to the circuit due to overload. Capacitor 87 provides a low effective impedance source for the inverter rectifier circuit and, together with capacitors 88, 89 and 92, radio frequency bypassing. The lamp may have to be standardized for use with ballast 16 by the addition of a resistor 93.

By way of specific example, the various components above referred to may be the following, some of which are identified by JEDEC numbers:

| | |
|---|---|
| High current rectifier | 4JA60B. |
| Autotransformer 20 | Turns ratio 1:5. |
| Storage capacitor 29 | 2000 microfarads; 100 volt. |
| Resistor 30 | 5 ohm; 5 watt. |
| Resistor 31 | 1 ohm; 5 watt. |
| Unijunction transistor 37 | 2N491. |
| Resistor 39 | 47K ohms; 0.5 watt. |
| Capacitor 40 | 0.1 microfarad; 200 volt. |
| Resistors 43 and 53 | 470 ohms; 0.5 watt. |
| Resistor 47 | 100 ohms; 0.5 watt. |
| Silicon controlled rectifiers 48 and 67 | C35B. |
| Diodes 54, 57 and 75 | 1N538. |
| Capacitor 58 | 50 microfarads; 100 volt. |
| Transformer 60 | 1:6 turns ratio. |
| Resistor 61 | 0.3 ohm; 5 watts. |
| Diode 62 | 1N2156R. |
| Resistor 65 | 75 ohms; 25 watts. |
| Resistor 68 | 100 ohms; 5 watts. |
| Capacitor 70 | 100 microfarads; 150 volt. |
| Zener diode 74 | 1N1375A (100 volt). |
| Transformer 78 | Turns ratio 1:200. |
| Capacitor 81 | .002 microfarad; 20 kv. |
| Spark gap 82 | 10 kv. |

From the above components, it will be noted that the RC time constant of resistor 39 and capacitor 40 relative to the voltage on the base of the unijunction transistor 37 provided through resistor 43 is such that the transistor 37 oscillates at a repetition rate of approximately 300 cycles per second. The trigger pulses have a magnitude of 4 volts in a period of approximately 10 microseconds which are sufficient to trigger silicon controlled rectifier 48. Since the voltage of the pulse is controlled through resistor 47, this resistor may be changed to vary the voltage applied to the silicon controlled rectifier 48. The trigger pulse is applied to rectifier 48 through the transformer 46 so as to remove any D.C. component of the oscillator output. As pointed out previously, the transformer 46 is controlled by the current through the lamp after starting such as to decouple the oscillator action from the lamp.

The silicon controlled rectifier 48 thus follows the 300 cycles per secondary trigger pulse and begins to conduct approximately 0.5 to 1 microsecond after the trigger is initiated. The rectifier conducts for a period sufficient to cause transformer 50 to saturate which, assuming the load to be infinite, is 350 microseconds and the output of transformer 60 is a 170 volt pulse. The conduction period shortens as the load decreases since the voltage distribution shifts and the volt-seconds necessary to saturate transformer 50 remain constant. During the conduction period of the silicon controlled rectifier 48, a charge is placed on capacitor 58 which, upon saturation of transformer 50, discharges a reverse current for a duration more than 20 microseconds which is sufficient to turn off the silicon controlled rectifier 48 by raising the cathode voltage above that of the anode voltage. The voltage across the capacitor 29 rises at the rate of approximately 135 volts per second. As the output of transformer 60 is applied to storage capacitor 29 and operating capacitor 70 of the pulse generating circuit, energy is stored therein. The zener diode 74 is a substantially constant voltage device which conducts when the voltage rises to 100 volts (the zener voltage of diode 74 may be varied to suit the lamp starting requirements); thus, at 100 volts, approximately 10 joules of energy is stored in capacitor 29 and 0.5 joule in operating capacitor 70. At 100 volts, the zener current applied to gate 73 of silicon controlled rectifier 67 is sufficient to make silicon controlled rectifier 67 conductive, extracting approximately 0.5 joule from the operating capacitor and delivering it through transformer 78. The voltage dropping below 100 volts, the zener diode becomes non-conductive and silicon controlled rectifier 67 is turned off by the tendency of the inductance of ringing transformer 78 and capacitor 70 to oscillate and reverse the current flow through silicon controlled rectifier 67. Capacitors 88 and 89 limit the rate of voltage reapplied to the controlled rectifier 67 to assure turn-off of that device. The 100 volt pulse is stepped up by the turns ratio of 1:200 of transformer 78 and the voltage on capacitor 81 rises toward 20,000 volts. The spark gap 82 breaks down when the voltage reaches 10,000 volts and the pulse is delivered into effective primary 83 of autotransformer 20. The step-up ratio of the autotransformer 20 being 1:5, a 50 kv. high frequency pulse is provided to the lamp. The negative coefficient of resistance of the lamp after starting causes the arc drop across the lamp to fall below 100 volts after ignition, thus stopping the operation of the pulse generator circuit, since zener diode 74 does not trigger the gate of silicon controlled rectifier 67. The 10 joules of energy stored in the capacitor 29 serve to maintain the operation of the lamp and develop a hot spot on the cathode until the voltage drop across the lamp falls below the source voltage wherein the source voltage takes over operation of the lamp through current limiting resistor-ballast 16 and high current rectifier 18. The resistance of wire 84 relative to resistance 86 is set such that when the current drawn by the lamp 11 rises to approximately 60 amperes the operation of the inverter rectifier 26 ceases and no further charging of storage capacitor 29 therefrom takes place during the operation of the lamp.

In order for the high voltage pulse to break down the gap between the lamp electrodes, there must be free ions and electrons in the xenon gas. For these free electrons, normally cosmic radiation produces a low level ionization which provides this source. It has been found that by depending on such natural radiation starting is rather haphazard; therefore, to insure positive breakdown on each pulse, a fine wire 90 touching the neck of the lamp near the anode and connected to the cathode produces sufficient high field ionization in the gas. Since this wire also lowers the minimum voltage required for breakdown, the lamp will fire before the pulse voltage reaches peak value, thus reducing the voltage stress on the insulation. The complete starting process involves capacitive "corona" ionization to provide free ions and electrons, a high voltage low energy spark discharge which provides high ionization, and the high energy follow through arc at an intermediate voltage which develops a hot spot on the cathode for electron emission and lower voltage drop. For normal arc at high current and low voltage, the capacitors provide suppression of noise.

While the invention has been specifically disclosed and the preferred embodiment thereof shown, it should be understood that the invention may be widely modified within the spirit and scope of the appended claims.

What I claim as new and desire to secure by Letters Patent of the United States is:

1. A starting and ballasting circuit for operating a discharge lamp from a low voltage direct current source, said lamp requiring a very high ignition voltage followed by an intermediate voltage of magnitude greater than that of said source sustained for a time sufficient to assure cathode warm up in order for the arc drop across the lamp to fall below the value of the source voltage comprising: an operating circuit including a current limiting impedance, a high current rectifier and the lamp connected in series across the source terminals; means connected in parallel with said operating circuit for producing a unidirectional pulsating current comprising a chopper circuit connected across said source terminals including an oscillator circuit and transforming means energized thereby; a secondary circuit connected to said transforming means including a rectifier and a first storage capacitor for charging up to said intermediate voltage during operation of said chopper circuit, said storage capacitor being connected across said lamp and said high current rectifier being poled to prevent inverse discharge thereof through said source; a pulse generating circuit connected across said storage capacitor for producing a damped oscillatory train of high voltage pulses including an operating capacitor, a ringing transformer, a second storage capacitor, a spark gap and a pulse transformer, a first oscillating circuit being formed by said ringing transformer and said operating capacitor, and a second oscillating circuit comprising the primary of said pulse transformer, said second storage capacitor and said spark gap for inducing said high voltage pulses in said pulse transformer for igniting said lamp; the charge across said first storage capacitor serving to sustain current through said lamp at an intermediate voltage level during cathode warm up operable by said operating circuit; and means for disabling said chopper circuit when the current through said lamp rises above a predetermined level.

2. A starting and ballasting circuit for operating a discharge lamp from a low voltage direct current source, said lamp requiring a very high ignition voltage followed by an intermediate voltage of magnitude greater than that of said source sustained for a time sufficient to assure cathode warm up in order for the arc drop across the lamp to fall below the value of the source voltage comprising: an operating circuit including a current limiting impedance, a high current rectifier and the lamp connected in series across the source terminals; means connected in parallel with said operating circuit for producing a unidirectional pulsating current comprising a chopper circuit including a resistor, a unijunction transistor, and a capacitor connected across said source terminals to form an oscillator circuit and transforming means energized thereby; a secondary circuit connected to said transforming means including a rectifier and a storage capacitor for charging up to said intermediate voltage during operation of said chopper circuit, said storage capacitor being connected across said lamp and said high current rectifier being poled to prevent inverse discharge thereof through said source; a pulse generating circuit being connected in a charging circuit across said capacitor for producing a damped oscillatory train of high voltage pulses for igniting said lamp; the charge across said storage capacitor serving to sustain current through said lamp at an intermediate voltage level during cathode warm up, and means operable by said operating circuit for disabling said chopper circuit when the current through said lamp rises above a predetermined level.

3. A starting and ballasting circuit for operating a discharge lamp from a low voltage direct current source, said lamp requiring a very high ignition voltage followed by an intermediate voltage of magnitude greater than that of said source sustained for a time sufficient to assure cathode warm up in order for the arc drop across the lamp to fall below the value of the source voltage comprising: an operating circuit including a circuit limiting impedance, a high current rectifier and the lamp connected in series across the source terminals; means connected in parallel with said operating circuit for producing a unidirectional pulsating current comprising a chopper circuit including an oscillator circuit connected across said source terminals, transforming means energized thereby, and a secondary circuit connected to said transforming means including a first storage capacitor for charging up to said intermediate voltage during operation of said chopper circuit, said storage capacitor being connected across said lamp and said high current rectifier being poled to prevent inverse discharge thereof through said source; a pulse generating circuit comprising an operating capacitor, a controlled rectifier having a control electrode, a ringing transformer, a second storage capacitor, a spark gap, and a pulse transformer, said operating capacitor being connected in a charging circuit across said first storage capacitor, the primary of said ringing transformer and said controlled rectifier being connected in series across said operating capacitor to form a discharge loop, circuit means including an electron control device connected between said operating capacitor and the control electrode of said controlled rectifier for turning on said controlled rectifier when the charge across said operating capacitor reaches a predetermined level, an oscillating circuit formed by the primary of said pulse transformer, said second storage capacitor and said spark gap for inducing a damped oscillatory train of high voltage pulses in said pulse transformer for igniting said lamp when said controlled rectifier is turned on and discharges said operating capacitor; the charge across said first storage capacitor serving to sustain current through said lamp at an intermediate voltage level during cathode warm up, and means operable by said operating circuit for disabling said chopper circuit when the current through said lamp rises above a predetermined level.

4. A starting and ballasting circuit for operating a discharge lamp from a low voltage direct current source, said lamp requiring a very high ignition voltage followed by an intermediate voltage of magnitude greater than that of said source sustained for a time sufficient to assure cathode warm up in order for the arc drop across the lamp to fall below the value of the source voltage comprising: an operating circuit including a circuit limiting impedance connected in series with the lamp across the source terminals; means connected in parallel with said operating circuit for producing a unidirectional pulsating current comprising a chopper circuit including a resistor, a unijunction transistor, and a capacitor connected in series across said source terminals to form an oscillatory circuit, and transforming means energized thereby; a pulse generating circuit comprising a capacitor, a spark gap, and a pulse transformer being connected in a charging circuit to the output of said chopper circuit for producing a damped oscillatory train of high voltage pulses in said pulse transformer for igniting said lamp; a secondary circuit connected to said transforming means including a storage capacitor for charging up to said intermediate voltage during operation of said chopper circuit, the charge across said storage capacitor serving to sustain current through said lamp at the intermediate voltage level during cathode warm up, and a high current rectifier poled to prevent inverse discharge of the storage capacitor through said source.

5. A starting and ballasting circuit for operating a discharge lamp from a low voltage direct current source, said lamp requiring a very high ignition voltage followed by an intermediate voltage of magnitude greater than that of said source sustained for a time sufficient to assure cathode warm up in order for the arc drop across the lamp to fall below the value of the source voltage comprising: a chopper circuit including a controlled rectifier and step-up transforming means connected in series across said source terminals, an oscillator circuit connected to said source terminals and to the control electrode of the controlled rectifier for turning on said controlled rectifier, and means for turning off said controlled rectifier including a saturable transformer and a capacitor connected in series across the cathode and anode of the controlled rectifier; a pulse generating circuit comprising an operating capacitor, a controlled rectifier, a ringing transformer, a storage capacitor, a spark gap, and a pulse transformer, said operating capacitor being connected in a charging circuit across the output of said chopper circuit, the primary of said ringing transformer and said controlled rectifier being connected in series across said operating capacitor to form a discharge loop circuit, means for turning on said controlled rectifier when the charge across said operating capacitor reaches a predetermined level, an oscillating circuit formed by the primary of said pulse transformer, said storage capacitor and said spark gap and connected to the output of said ringing transformer for inducing a damped oscillatory train of high voltage pulses in said pulse transformer for igniting said lamp when the controlled rectifier is turned on and discharges said operating capacitor; a secondary circuit connected to the output of said chopper circuit including a second storage capacitor for charging up to said intermediate voltage during operation of said chopper circuit for providing current to the lamp at an intermediate voltage level during cathode warm up, and a high current rectifier being poled to prevent inverse discharge of said second storage capacitor through said source; and an operating circuit including a current limiting impedance, said high current rectifier, and the lamp connected in series across the source terminals.

6. A starting and ballasting circuit for operating a discharge lamp from a low voltage direct current source, said lamp requiring a very high ignition voltage followed by an intermediate voltage of magnitude greater than that of said source sustained for a time sufficient to assure cathode warm up in order for the arc drop across the lamp to fall below the value of the source voltage comprising: a chopper circuit including a controlled rectifier and step-up transforming means connected in series across said source terminals, an oscillator circuit including a resistor, a unijunction transistor, and a capacitor connected in series to said source terminals and to the control electrode of the controlled rectifier for turning on said controlled rectifier, and means for turning off said controlled rectifier including a saturable transformer and a capacitor connected in series across the cathode and anode of the controlled rectifier; a pulse generating circuit comprising an operating capacitor, a controlled rectifier, a ringing transformer, a storage capacitor, a spark gap, and a pulse transformer, said operating capacitor being connected in a charging circuit across the output of said chopper circuit, the primary of said ringing transformer and said controlled rectifier being connected in series across said operating capacitor to form a discharge loop circuit, means for turning on said controlled rectifier when the charge across said operating capacitor reaches a predetermined level, an oscillating circuit formed by the primary of said pulse transformer, said storage capacitor and said spark gap and connected to the output of said ringing transformer for inducing a damped oscillatory train of high voltage pulses in said pulse transformer for igniting said lamp when the controlled rectifier is turned on and discharges said operating capacitor; a secondary circuit connected to the output of said chopper circuit including a second storage capacitor for charging up to said intermediate voltage during operation of said chopper circuit for providing current to the lamp at an intermediate voltage level during cathode warm up, and a high current rectifier being poled to prevent inverse discharge of said second storage capacitor through said source; and an operating circuit including a current limiting impedance, said high current rectifier, and the lamp connected in series across the source terminals.

7. A starting and ballasting circuit for operating a discharge lamp from a low voltage direct current source, said lamp requiring a very high ignition voltage followed by an intermediate voltage of magnitude greater than that of said source sustained for a time sufficient to assure cathode warm up in order for the arc drop across the lamp to fall below the value of the source voltage comprising: a chopper circuit including a controlled rectifier and step-up transforming means connected in series across said source terminals, an oscillator circuit connected to said source terminals and to the control electrode of the controlled rectifier for turning on said controlled rectifier, and means for turning off said controlled rectifier including a saturable transformer and a capacitor connected in series across the cathode and anode of the controlled rectifier; a pulse generating circuit connected to said chopper circuit for inducing a damped oscillatory train of high voltage pulses for igniting said lamp; a secondary circuit connected to the output of said chopper circuit including a storage capacitor for charging up to said intermediate voltage during operation of said chopper circuit for providing current to the lamp at an intermediate voltage level during cathode warm up, and a high current rectifier being poled to prevent inverse discharge of said storage capacitor through said source; and an operating circuit including a current limiting impedance, said high current rectifier, and the lamp connected in series across the source terminals.

8. A starting and ballasting circuit for operating a discharge lamp from a low voltage direct current source, said lamp requiring a very high ignition voltage followed by an intermediate voltage of magnitude greater than that of said source sustained for a time sufficient to assure cathode warm up in order for the arc drop across the lamp to fall below the value of the source voltage comprising: a chopper circuit including a controlled rectifier and step-up transforming means connected in series across said source terminals, an oscillator circuit including a resistor, a unijunction transistor, and a capacitor connected in series to said source terminals and to the control electrode of the controlled rectifier for turning on said controlled rectifier, and means for turning off said controlled rectifier including a saturable transformer and a capacitor connected in series across the cathode and anode of the controlled rectifier; a pulse generating circuit connected to the output of said chopper circuit for inducing a damped oscillatory train of high voltage pulses for igniting said lamp; a secondary circuit connected to the output of said chopper circuit including a storage capacitor for charging up to said intermediate voltage during operation of said chopper circuit for providing current to the lamp at an intermediate voltage level during cathode warm up, and a high current rectifier being poled to prevent inverse discharge of said storage capacitor through said source; and an operating circuit including a current limiting impedance, said high current rectifier, and the lamp connected in series across the source terminals.

References Cited by the Examiner

UNITED STATES PATENTS

| | | | |
|---|---|---|---|
| 2,235,385 | 3/41 | Rava | 315—174 X |
| 2,737,612 | 3/56 | Sims | 315—289 X |
| 2,889,489 | 6/59 | Bird | 315—174 X |
| 2,926,287 | 2/60 | Bird | 315—289 X |
| 2,975,331 | 3/61 | Diaz et al. | 315—289 X |
| 3,019,355 | 1/62 | Morgan | 307—88.5 |

OTHER REFERENCES

SCR Manual (General Electric publication), 2nd edition, 1961, page 149.

DAVID J. GALVIN, *Primary Examiner.*

JAMES D. KALLAM, *Examiner.*

UNITED STATES PATENT OFFICE
CERTIFICATE OF CORRECTION

Patent No. 3,189,790                                        June 15, 1965

Joe A. Nuckolls

It is hereby certified that error appears in the above numbered patent requiring correction and that the said Letters Patent should read as corrected below.

Column 2, line 22, strike out "inverter rectifier --; lines 64 and 65, strike out "high energy,"; column 3, line 74, for "braker" read -- breaker --; column 6, line 20, after "up" insert --; and means --; same line 20, after "circuit" strike out "; and means"; line 59, for "circuit", second occurrence, read -- current --; column 7, line 30, for "circuit", second occurrence, read -- current --.

Signed and sealed this 21st day of December 1965.

(SEAL)
Attest:

ERNEST W. SWIDER                                EDWARD J. BRENNER
Attesting Officer                                     Commissioner of Patents